Dec. 11, 1945.　　　A. L. BAYLES　　　2,390,915
PISTON
Filed Sept. 2, 1944
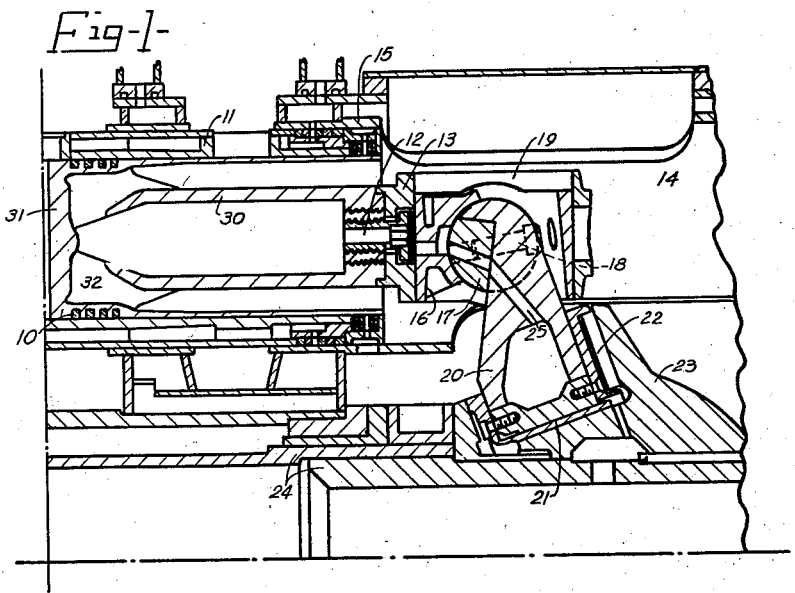
Fig-1-
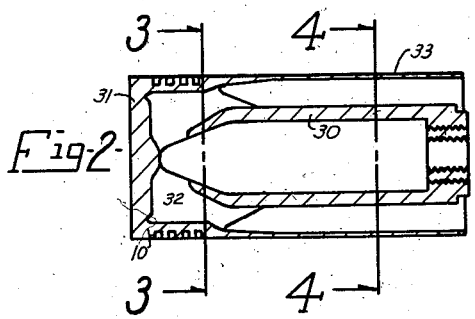
Fig-2-
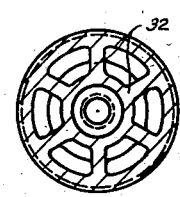
Fig-3-
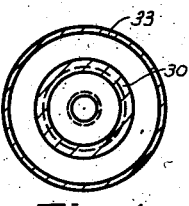
Fig-4-
INVENTOR
ALLISON L. BAYLES
BY Edwin S. Hall
ATTORNEYS Patented Dec. 11, 1945

2,390,915

UNITED STATES PATENT OFFICE 2,390,915

PISTON

Allison L. Bayles, Larchmont, N. Y., assignor to Rogers Diesel and Aircraft Corporation, New York, N. Y., a corporation of New York Application September 2, 1944, Serial No. 552,513

3 Claims. (Cl. 309—2)

This invention relates to pistons for internal combustion engines of the class having cylinders parallel to the shaft, the class commonly called barrel type, axial, or round engines.

In discussing such engines confusion may be avoided by defining a few terms. A plate member mounted on bearings on and inclined to the shaft, and having arms operably connected to the reciprocating members, may be called a "conplate" or preferably a "starplate." A plate member inclined to and rotating with the shaft is called a "slant." Usually the starplate is operable between two slants, and the starplate bearings may include a journal bearing and slipper thrust bearings, the slippers pivoted on the starplate and operable with film lubrication upon one or both slants.

In opposed-piston engines of this class, the reciprocating member may comprise a crosshead and a piston, either integral or fastened together, the crosshead operable in crosshead guides and the piston operable in the cylinder. The crosshead guides and cylinder may not be precisely coaxial, or the operating clearances may cause the crosshead to deviate slightly from alignment with the cylinder. An object of this invention is to provide a reciprocating member whose piston head is connected to the crosshead by a central column carrying the load, with a relatively light skirt depending from the piston head and flexible enough to follow the cylinder closely even when the crosshead may deviate slightly from the cylinder axis. Another object is to provide a piston having ample internal surfaces by which to transmit heat to the cooling oil, a piston in which the cooling oil may be introduced thru the central column, thrown against the inside of the head at each outward stroke of the piston, and almost entirely thrown out of the piston on the next succeeding inward stroke.

In the drawing, Fig. 1 is a longitudinal section of part of an opposed-piston barrel engine with a starplate mechanism; Fig. 2 is a longitudinal section of the piston shown in Fig. 1; Fig. 3 is a transverse section on the line 3—3 of Fig. 2; and Fig. 4 is a transverse section on the line 4—4 of Fig. 2.

Referring to the drawing, Fig. 1 shows a radial section of a starplate mechanism as might be used in an opposed-piston barrel engine. Piston 10 reciprocates in cylinder 11, and is connected by screw 12 to crosshead 13 which is operable in crosshead guide 14. The cylinder unit is clamped in frame 15 in a continuation of the same cylindrical bore that forms crosshead guide 14.

Pinhead 16 is operable in the cylindrical bore 19 thru crosshead 13. Wristpin 17 is operable in the cylindrical bore thru pinhead 16, and is fastened to an arm of starplate 20 by screws 18.

Starplate 20 is operable on journal bearing 21, and the combined thrust of all pistons 10 is taken by slippers 22 coacting with slant 23 which is keyed to shaft 24. Operation of the mechanism is well understood, the reciprocation of pistons 10 being accompanied by rotation of shaft 24 and slant 23.

Oil is fed thru the interior of shaft 24 to lubricate the slippers 22 and other working parts, and is also fed thru the interior of starplate 20 and thru the drilled holes 25 in the starplate arm and wristpin 17, then thru screw 12 into the interior of column 30 of piston 10. During the forward half of the piston strokes, when the inertia is toward the piston head, the oil flowing into column 30 collects in the inside of piston head 31 in the spaces between webs 32. When the inertia reverses during the other half of the piston strokes, the restricted neck of column 30 causes most of the oil to be thrown out of the piston, bathing the exterior surface of column 30 and the interior of skirt 33 on the way out, carrying away the heat taken from contact with the internal surfaces of the piston.

It is obvious also that piston skirt 33 can be light enough, with enough flexibility, to follow the cylinder 11 even if crosshead 13 should be slightly out of alignment with cylinder 11. Column 30 carries the thrust of piston head 31, received thru webs 32, to the central part of crosshead 13, where pinhead 16 and wristpin 17 transmit it directly to the arm of starplate 20.

While I have shown and described a particular mechanism embodying my invention, it is understood that other constructions may be used without departing from the spirit or scope of the invention as expressed in the following claims.

I claim:

1. A reciprocating member for an internal combustion engine comprising a crosshead and a piston, a piston head on said piston, a tubular column coaxial with the piston and crosshead, radial webs connecting said column with said piston head with spaces between said webs for the flow of oil, said column being constricted at attachment to said webs, the thrust of said piston head being carried thru said webs and column to said crosshead, and a piston skirt depending from said piston head surrounding but not otherwise attached to said column.

2. A reciprocating member for an internal combustion engine comprising a crosshead and a piston, a piston head on said piston, a tubular column coaxial with the piston and crosshead, radial webs connecting said column with said piston head with spaces between said webs for the flow of oil, the thrust of said piston head being carried thru said webs and said column to said crosshead, and a piston skirt depending from said piston head and not otherwise connected with said column.

3. A reciprocating member for an internal combustion engine comprising a crosshead and a piston, a piston head on said piston, a tubular column coaxial with the piston and crosshead and connecting said piston head to said crosshead, a flexible piston skirt depending from the piston head and not otherwise connected with said column, and passages for oil flow from within said column into said piston head and out from between said column and said skirt.

ALLISON L. BAYLES.